Aug. 4, 1931.  V. K. ZWORYKIN  1,817,502
TELEVISION APPARATUS
Filed Feb. 15, 1929
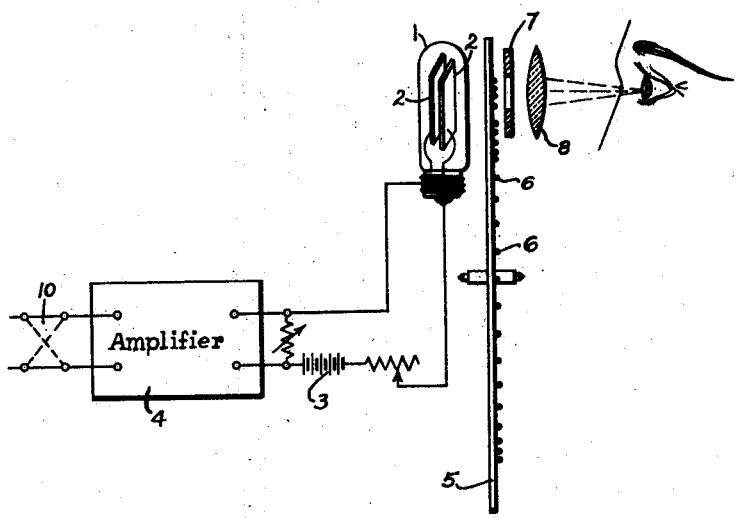
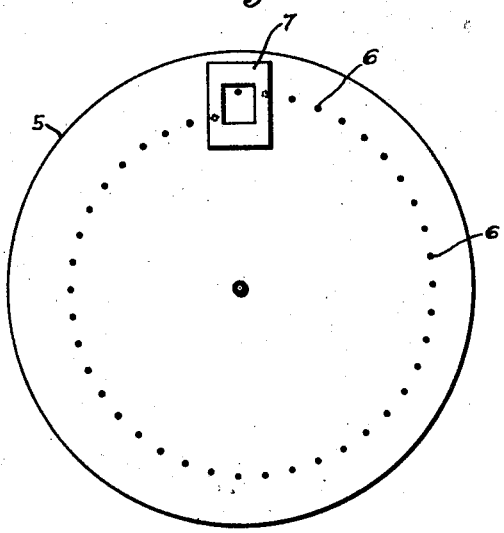
INVENTOR
Vladimir K. Zworykin
BY
Wesley Carr
ATTORNEY Patented Aug. 4, 1931

1,817,502

UNITED STATES PATENT OFFICE

VLADIMIR K. ZWORYKIN, OF SWISSVALE, PENNSYLVANIA, ASSIGNOR TO WESTINGHOUSE ELECTRIC & MANUFACTURING COMPANY, A CORPORATION OF PENNSYLVANIA

TELEVISION APPARATUS

Application filed February 15, 1929. Serial No. 340,272.

My invention relates to television apparatus, and it has particular relation to the scanning devices employed at television receiving stations for the purpose of assembling a complete visual representation of a distant object from a succession of incoming electrical impulses representative of the lights and shadows of the view being transmitted.

In the majority of television systems, as at present constructed, the receiving apparatus comprises a glow-lamp that is responsive to voltage variations, a rotating disc provided with a spirally disposed series of openings, and a viewing lens. The incoming electrical impulses are impressed, after amplification, upon the glow-lamp, and the observer, by viewing the lamp through the lens and the openings in the rotating disc, receives a visual impression of the view being transmitted, the phenomenon of persistence of vision causing the lines traced by the openings in the rotating disc across the lamp to merge together.

The glow-lamp, as heretofore used, comprises two flat electrodes mounted in a partially evacuated container and disposed parallel to each other at a distance apart less than the mean free path of the molecules of the residual gas enclosing them. When a relatively high potential is impressed across the electrodes, a glow discharge takes place between the nonadjacent surfaces of the electrodes, the intensity of the glow being dependent, within certain limits, upon the impressed potential.

The intrinsic brilliancy of the glow, however, is low, and an insufficient amount of light passes through the openings in the receiving disc for projecting upon a screen, or for direct observation except in a darkened room.

It is, accordingly, an object of by invention to provide an improved scanning device for television receivers that shall give rise to improved visibility of the received view.

Another object of my invention is to provide an improved scanning device for television receivers that shall be inexpensive and shall be simple in construction.

Another object of by invention is to provide a television receiving system wherein the received image may be viewed either as a positive or as a negative.

A television receiving system constructed according to my invention preferably comprises a demodulator and an amplifier for deriving electrical impulses representative of the transmitted view from an incoming carrier wave, a glow-lamp upon which the amplified impulses are impressed, a viewing lens, and a rotatable, transparent disc upon which are spirally disposed a plurality of small, opaque spots. Means are provided for causing the disc to so rotate between the glow-lamp and the viewing lens that the opaque spots pass horizontally in succession before the glow lamp at such a rate of speed as to completely scan the illuminated electrode in the glow-lamp sixteen times, or more, per second.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which:

Figure 1 is a diagrammatic view of certain of the essential elements of a television receiving system comprising a preferred embodiment of my invention.

Fig. 2 is a view, in elevation, of my improved scanning disc.

The apparatus illustrated in the drawings comprises a light source constituted by a partially evacuated container 1 wherein are disposed a plurality of flat electrodes 2 spaced apart from one another a distance less than the mean free path of the residual gas in the container. The gas may be either neon, helium, or the like, depending upon the color desired.

A source of potential 3 is included in circuit between the electrodes 2 and the output terminals of an amplifier 4 of conventional type, the said source serving to maintain the tube in the glowing condition, as is well known to those skilled in the art. The amplifier may comprise a demodulator if the incoming signals, representative of a transmitted view, exist as modulations upon a high frequency carrier-wave.

A transparent disc 5, provided with a spirally disposed series of opaque spots 6, is rotatably mounted intermediate the light source and a viewing aperture, or frame 7. The aperture is preferably approximately one inch square and, in order that the received picture shall be more easily visible, an enlarging lens 8 is disposed adjacent thereto.

The disc may be made of any light-permeable material, such as glass, bakelite, or the like, which has sufficient strength to withstand the centrifugal forces developed when it is rotated at a high speed.

The opaque spots may be painted upon the surface of the disc or they may be constituted by opaque fillings disposed in a plurality of small openings drilled into or through the disc. The thickness of the opaque spots is greatly exaggerated in Fig. 1 merely for purposes of explanation.

In the operation of a television receiving system constructed according to my invention, it is assumed that the incoming signals are derived through the operation of a scanning disc at the transmitting end, which disc causes either a spot of light to traverse the object, the image of which is to be transmitted, or which scans an image of the object formed by optical means. In either event, the varying amounts of light reflected from the object at the transmitting end are caused to fall upon one or more photoelectric cells, the output currents from which are utilized to modulate a high frequency carrier current.

At the receiving end, if the view exists as a modulation of a high frequency carrier current, it must, of necessity, be demodulated. After demodulation, the electrical impulses are amplified and are impressed across the electrodes of the glow lamp, the illumination from which varies in response to the said impulses.

If, therefore, the transparent scanning disc is caused to rotate between the eye of the observer and the glow lamp, the opaque spots will trace a succession of lines across the luminous electrode of the lamp, which lines are more or less visible, depending upon the illumination of the electrode at each instant of the travel of the successive spots across it.

By reason, therefore, of the phenomenon of persistence of vision, since the disc is rotated at such a speed as to completely scan the light source at least sixteen times per second, the received view will, if the connections in the amplifier are such as are ordinarily utilized in television reception apparatus, be negatives of the view at the transmitting end. In other words, the high lights at the transmitting end will appear as shadows in the received view, while the shadows will appear as high lights. In order, therefore, that the received view shall be a true reproduction of the object being "televised," it is necessary that the connections in the amplifier shall be reversed. A reversing switch 10, shown in Fig. 1, is supplied for this purpose, it being, of course, understood that this switch is not necessarily disposed in the position indicated but may be incorporated into the amplifier or demodulator itself in the proper position between successive tubes. I have not illustrated the position of the reversing switch more particularly inasmuch as its operation and location will be apparent to those skilled in the art.

Inasmuch as the major portion of the glow lamp electrode is always completely visible through the viewing aperture, the brilliancy of the received image is much greater than in systems of the conventional type wherein the scanning disc is opaque and is provided with a plurality of minute openings corresponding to the opaque spots on my improved disc. In fact, the received image may be sufficiently brilliant to enable its projection upon a screen, although I have not illustrated this possibility.

A scanning disc constructed according to my invention is quite inexpensive to make and, if it is found, upon trial, that the opaque spots have not been correctly positioned, it is a simple matter to remove the ones that are incorrect and to repaint them in the proper points.

Many modifications of my improved scanning disc will be apparent to those skilled in the art. My invention, therefore, is not to be restricted to the specific embodiment chosen for purposes of illustration, but it is to be limited only by the scope of the prior art or by the spirit of the appended claims.

I claim as my invention:

1. As an article of manufacture, a scanning device for view-transmission systems comprising a generally light-permeable element having a plurality of opaque regions.

2. As an article of manufacture, a scanning device for view transmission systems comprising a generally light-permeable element having a plurality of opaque regions, the said regions being disposed in predetermined relation with one another.

3. As an article of manufacture, a scanning device for view transmission systems comprising a generally transparent disc having a plurality of opaque regions, the said regions being disposed in predetermined relation with one another.

4. As an article of manufacture, a scanning device for view-transmission systems comprising a generally transparent disc having a plurality of opaque regions, the said regions being spirally disposed in the plane of the disc.

5. As an article of manufacture, a scanning device comprising a generally transparent disc having a plurality of opaque spots spirally disposed thereon.

6. In television receiving apparatus, means for deriving electrical impulses from incoming signals representative of a transmitted view, means for producing light varying in accordance with said impulses, and a scanning device comprising a generally transparent element having a plurality of opaque regions disposed adjacent to said light producing means.

7. In television receiving apparatus, means for producing light, means for causing said light to vary in response to incoming signals representative of a view being received, a scanning device comprising a generally transparent element having a plurality of opaque regions disposed adjacent to said light producing means, and means for altering the relation of said light variations to said signals, whereby either a positive or negative visual representation of said transmitted view may be had.

In testimony whereof, I have hereunto subscribed my name this 15th day of February 1929.

VLADIMIR K. ZWORYKIN.